United States Patent [19]

Shibata

[11] Patent Number: 4,586,455
[45] Date of Patent: May 6, 1986

[54] LID KNOB OF PRESSURE COOKER

[75] Inventor: Yoshikazu Shibata, Tokyo, Japan

[73] Assignee: Japan Life Co., Ltd., Tokyo, Japan

[21] Appl. No.: 655,095

[22] Filed: Sep. 27, 1984

Related U.S. Application Data

[63] Continuation-in-part of Ser. No. 570,242, Jan. 12, 1984, Pat. No. 4,548,156.

[51] Int. Cl.⁴ .................... G08B 3/00; A47J 27/36.06; A47J 27/56
[52] U.S. Cl. .................... 116/67 R; 99/342; 126/388
[58] Field of Search .................... 99/342, 344; 116/70, 116/220, 67 R, 137 R; 126/388; 137/557; 220/203, 206, 367

[56] References Cited

U.S. PATENT DOCUMENTS

| 2,012,151 | 8/1935 | Whittier | 374/141 |
| 2,137,094 | 11/1938 | Nodine | 374/141 |
| 2,536,369 | 1/1951 | Hubbard | 220/367 |
| 3,827,596 | 8/1974 | Powers, Jr. | 220/367 |
| 4,385,585 | 5/1983 | Lebowitz | 116/67 R |

Primary Examiner—Charles Frankfort
Assistant Examiner—W. Morris Worth

[57] ABSTRACT

A lid knob for a pressure cooker contains a whistle which informs the user when boiling has occurred. The lid knob is designed so that the whistle hole of the knob may be rotated into alignment with the steam hole of the lid of the pressure cooker during initial heating and then rotated out of alignment with the steam hole once boiling has occurred. The lid knob is simple in structure and is easy to disassemble for cleaning.

4 Claims, 5 Drawing Figures

LID KNOB OF PRESSURE COOKER

This is a continuation-in-part of application Ser. No. 06/570,242, filed Jan. 12, 1984, now U.S. Pat. No. 4,548,156.

BACKGROUND OF THE INVENTION

The present invention relates to the lid knob of cookers such as pans, pots and others, and more particularly the lid knob of a pressure cooker which has a whistle activated by boiling within the pan and which further functions to open and close a steam hole.

Pressure cookers, i.e., pans which keep the steam from leaking outside and thus heighten the pressure and the boiling point within them, thereby shortening cooking time, have been used for some time. Ingredients are put into the pan when the water is fully boiled. If a boiling informer were furnished, overboiling would be avoided and fuel would be saved.

SUMMARY OF THE INVENTION

An object of the present invention is to provide a lid knob for a pressure cooker which may signal boiling and is simple in structure; easy to open; and easy to clean by disassembling.

The lid knob of the pressure pan according to the present invention is shown in the accompanying drawing.

DETAILED DESCRIPTION OF THE INVENTION

Figure 1:
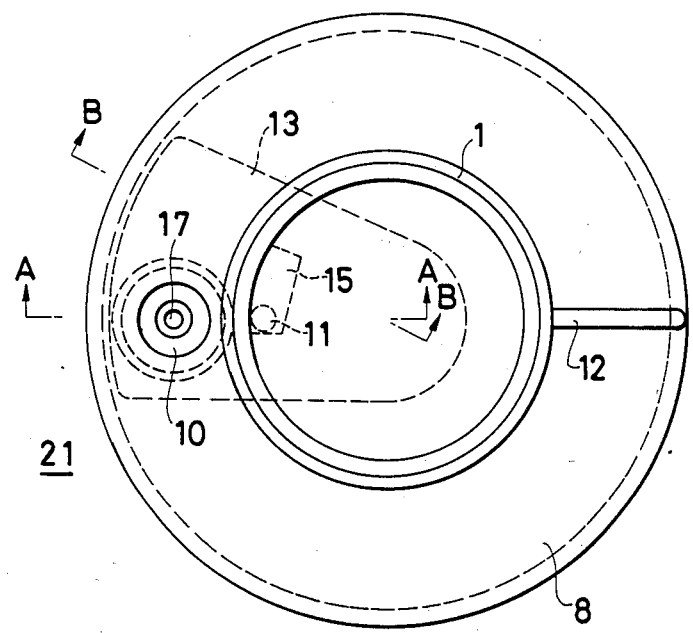
FIG. 1 is a plan view of an embodiment of the invention.
Figure 2:
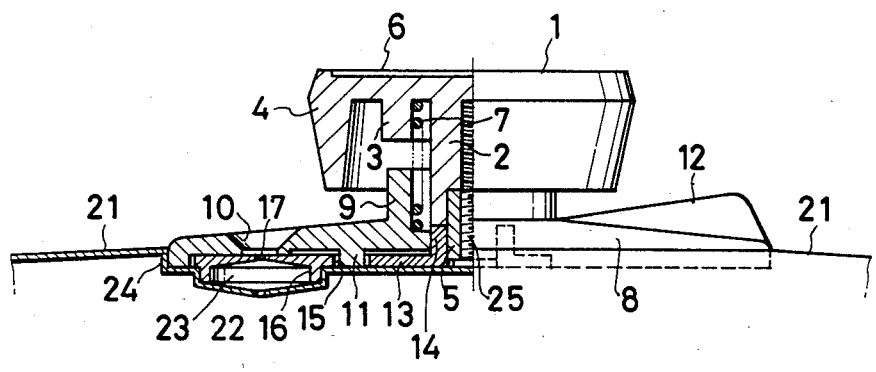
FIG. 2 is a cross sectional view seen from A —A in FIG. 1.
Figure 3:
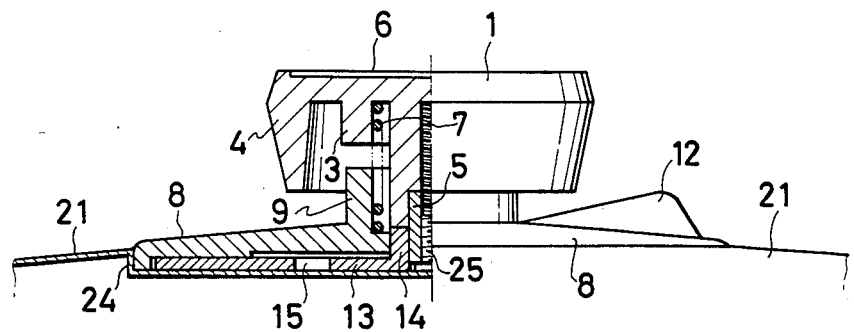
FIG. 3 is a cross sectional view seen from B —B in FIG. 1.
Figure 4:
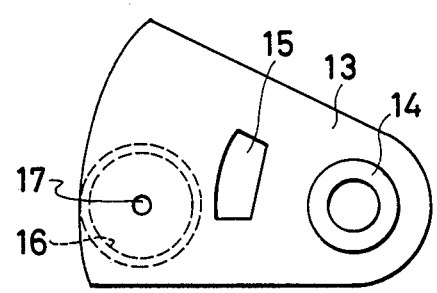
FIG. 4 is a plan view of one example of a guide plate.

FIGS. 1–4 show an embodiment of the invention. A thumb 1 is composed of a middle shaft 2, a middle wall 3 and a skirt 4. The middle shaft 2 is mounted on its end portion over the upper half of a female tube 5, or may be inserted with the female tube 5 over the full length of the middle shaft 2. Between the shaft 2 and the wall, a spring 7 is furnished to press down on stand 8 later mentioned. The thumb 1 is formed with a depression 6 for the placement of a brand plate.

The stand 8 is shaped like a shallow dish and is centrally provided with a sleeve 9 for holding the shaft 2 and the spring therein and has defined therein a hole 10 of conical shape communicating with a steam hole 22 of a pan lid 21. Further, the stand 8 is, on its reverse side, equipped with a stopper 11 extending downward, and is, if desired, formed with a pinch 12 of a suitable shape on its surface.

A guide plate 13 is provided with a sleeve 14 into which fits a lower exposed portion of the female tube 5, and is further formed with a guide hole 15 in the form of an arc contacting the stopper 11 at a part thereof. On a circumferential part of the reverse side, a circular fitting portion 16 is provided for fitting in a whistling depression 23 defined on the pan lid. The fitting portion 16 is centrally formed with a steam hole 17.

The pan lid 21 is defined with an exterior shallow depression 24 for receiving the stand 8, in addition to the whistling depression 23, and is centrally attached to a screw 25 which passes through tube 5 and finally into shaft 2 of thumb 1. Thus, pan lid 21 and tube 5 are secured to thumb 1 and the pan lid secured to the lid knob.

Figure 5:
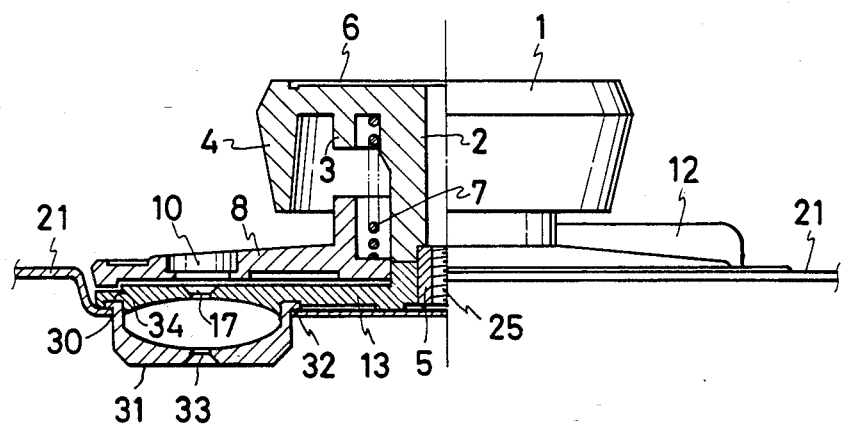
FIG. 5 is a cross sectional view showing the other embodiment of the invention, in section of the right half of a front part.

FIG. 5 shows a second embodiment of the present invention. Herein, the same reference numerals as those of the first embodiment indicate the same parts, and explanation therefor wll be omitted.

In the second embodiment, the pan lid 21 is not defined with the whistling depression 23, but is merely formed with a hole 30. Further, the guide plate 13 is not formed with the fitting portion 16, but formed with a spherical depression on its bottom surface, the center of the depression defining a steam hole 17. Instead of the whistling depression 23, a dish-shaped whistling valve 31 is provided at the depression. The whistling valve 31 is mounted in the hole 30 by positioning the flanged rim 32 of the whistling valve 31 on a complimentary flanged rim at a circumferential edge of the hole 30. Guide plate 13 is provided with a groove 34 for fitting the flange 32. The whistling valve 31 has a centrally positioned steam hole 33.

In the second embodiment, a stopper 11 and a guide hole 15 are placed in opposition to the whistling valve 31, i.e., under pinch 12.

The knob according to the first embodiment of the invention is set up by mounting the fitting portion 16 into the whistling depression 23 so that the guide plate 13 is attached to the pan lid 21, subsequently covering the stand 8 thereon such that the stopper 11 is positioned within the guide hole 15, and finally, securing the female tube 5 to the male screw 25 as the spring 7 is attached to the middle shaft 2 and thereby affixed to the thumb 1. The stand 8 and the guide plate 13 have no play since they are pressed down by the spring 7. Disassembly may be achieved in the reverse manner as that described above. Since both assembly and disassembly may be easily performed, the present invention is conveniently cleaned by disassembling.

In the second embodiment, setting-up is achieved by mounting the whistling valve 31 in the hole 30 of the pan lid 21, and the subsequent process is the same as in the first embodiment.

Thus, in the present invention, boiling is accompanied by whistling, and cooking may be made more efficient by closing the steam hole at this time and placing the ingredients into the cooker or lowering the heat. Accordingly, overboiling is prevented and fuel is saved. In addition, cleaning is easily carried out by disassembly.

The same is applicable to the second embodiment, but the second embodiment is easier to produce than the first, since it is not necessary to depress the pan lid 21.

It is to be understood that the present invention is not limited to the embodiments disclosed which are illustratively offered and that modifications may be made without departing from the invention.

What is claimed is:

1. A lid knob for a pressure cooker, comprising a thumb which is composed of a middle shaft secured to a female tube, a middle wall, said middle shaft and said middle wall defining a space holding a spring, and a skirt defining an outer circumference of said thumb; a dish-shaped stand which is centrally provided with a sleeve for receiving the middle shaft and the spring, said stand defining a hole in a circumferential portion thereof, said stand having a downwardly extending stopper; a guide plate which is centrally provided with a sleeve for receiving an exposed portion of the female tube and which also defines a guide hole for the stopper;

a lid defining a hole in a circumferential portion thereof, said guide plate having a whistling depression on a reverse side of a circumferential portion thereof adapted to align and communicate with said hole in said lid; said guide plate being open centrally of the whistling depression to form a steam hole adapted to align and communicate with said hole in said stand; a whistling valve for fitting in said hole in said lid, said whistling valve defining a steam hole centrally located therein, said steam hole in said whistling valve being adapted to align and communicate with said hole in said stand and said steam hole in said guide plate.

2. A lid knob of pressure cooker as set forth in claim 1, wherein a circumferential edge of the whistling valve is formed with a first flanged rim for mounting on a second, complimentary flanged rim formed in the lid, and a groove is formed in said reverse side of the guide plate for securing said first flange therein.

3. A lid knob of pressure cooker as set forth in claim 1, wherein the thumb, stand, guide plate, and whistling valve are made of plastic.

4. A lid knob of pressure cooker as set forth in claim 1, wherein the stand is provided with a pinch.

* * * * *